United States Patent
Gordo et al.

(10) Patent No.: US 8,699,789 B2
(45) Date of Patent: Apr. 15, 2014

(54) DOCUMENT CLASSIFICATION USING MULTIPLE VIEWS

(75) Inventors: Albert Gordo, Barcelona (ES); Florent C. Perronnin, Domène (FR)

(73) Assignee: Xerox Corporation, Norwalk, CT (US)

( * ) Notice: Subject to any disclaimer, the term of this patent is extended or adjusted under 35 U.S.C. 154(b) by 292 days.

(21) Appl. No.: 13/230,253

(22) Filed: Sep. 12, 2011

(65) Prior Publication Data

US 2013/0064444 A1    Mar. 14, 2013

(51) Int. Cl.
G06K 9/62    (2006.01)
G06K 9/74    (2006.01)
G06K 9/72    (2006.01)

(52) U.S. Cl.
USPC ............ 382/159; 382/224; 382/228; 382/229

(58) Field of Classification Search
CPC . G06K 9/6227; G06K 9/6267; G06K 9/6247; G06K 9/00442
USPC .................................. 382/224, 228, 159, 229
See application file for complete search history.

(56) References Cited

U.S. PATENT DOCUMENTS

| | | | |
|---|---|---|---|
| 8,122,005 B1 * | 2/2012 | Juang et al. | 707/710 |
| 8,484,194 B1 * | 7/2013 | Juang et al. | 707/710 |
| 2003/0021481 A1 | 1/2003 | Kasutani | |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2010/0040285 A1 | 2/2010 | Csurka et al. | |
| 2010/0082615 A1 | 4/2010 | Clinchant et al. | |
| 2010/0092084 A1 | 4/2010 | Perronnin et al. | |
| 2010/0098343 A1 | 4/2010 | Perronnin et al. | |

(Continued)

OTHER PUBLICATIONS

Zhi-Hua Zhou, De-Chuan Zhan, and Qiang Yang, "Semi-supervised learning with very few labeled training examples" In Proceedings of the 22nd national conference on Artificial intelligence—vol. 1 (AAAI 2007), Anthony Cohn (Ed.), vol. 1. AAAI Press 675-680.*

(Continued)

Primary Examiner — Utpal Shah
(74) Attorney, Agent, or Firm — Fay Sharpe LLP

(57) ABSTRACT

A training system, training method, and a system and method of use of a trained classification system are provided. A classifier may be trained with a first "cheap" view but not using a second "costly" view of each of the training samples, which is not available at test time. The two views of samples are each defined in a respective original feature space. An embedding function is learned for embedding at least the first view of the training samples into a common feature space in which the second view can also be embedded or is the same as the second view original feature space. Labeled training samples (first view only) for training the classifier are embedded into the common feature space using the learned embedding function. The trained classifier can be used to predict labels for test samples for which the first view has been embedded in the common feature space with the embedding function.

27 Claims, 5 Drawing Sheets

(56) References Cited

U.S. PATENT DOCUMENTS

| | | |
|---|---|---|
| 2010/0189354 A1 | 7/2010 | De Campos et al. |
| 2010/0191743 A1 | 7/2010 | Perronnin et al. |
| 2010/0318477 A1 | 12/2010 | Perronnin et al. |
| 2011/0022599 A1 | 1/2011 | Chidlovskii |
| 2011/0026831 A1 | 2/2011 | Perronnin et al. |
| 2011/0040711 A1 | 2/2011 | Perronnin et al. |
| 2011/0091105 A1 | 4/2011 | Perronnin |
| 2011/0137898 A1 | 6/2011 | Gordo et al. |
| 2011/0184950 A1 | 7/2011 | Skaff et al. |

OTHER PUBLICATIONS

U.S. Appl. No. 12/859,898, filed Aug. 20, 2010, Perronnin.

U.S. Appl. No. 12/890,789, filed Sep. 27, 2010, Sanchez.

Perronnin et al. "Fisher Kernels on Visual Vocabularies for Image Categorization", Proc. of the IEEE Conf. on CVPR, Jun. 2007, pp. 1-8.

Jegou, et al. "Improving bag-of-features for large scale image search", IJCV, 2010, pp. 316-336.

Perronnin, et al. "Improving Fisher kernel for large-scale image classification", ECCV, 2010, pp. 143-156.

Hardoon, et al. "Canonical correlation analysis; An overview with application in learning methods".

Foster et al. "Multi-view dimensionality reduction via canonical correlation analysis", Tech Report, 2010, Rutgers University, pp. 1-30.

Blaschko, et al. "Correlational Spectral Clustering", CVPR, 2008, pp. 1-8.

* cited by examiner

DOCUMENT CLASSIFICATION USING MULTIPLE VIEWS

BACKGROUND

The exemplary embodiment relates to the classification arts. It finds particular application in connection with the classification of samples where fewer than all features that are available at training time are used for the classification task.

Automated methods have been developed for classifying samples, such as scanned document images, based on features extracted from the samples. Parameters of a classifier model are learned during a training stage, using a set of training samples which have been labeled, often manually, according to their class. For each training sample, a representation of the sample, such as a multidimensional vector, is generated based on features extracted from the sample. The representation, together with the respective label, forms the training data for the classifier model. At test time, when a test sample is to be labeled, a representation of the test sample is input to the trained classifier model, or to a set of classifier models, and the most probable class label is assigned to the test sample, based on the output of the classifier model(s), or labels are assigned probabilistically over all classes. Various types of features have been used for this task. In the case of text documents, for example, features which have been used include word frequency features, layout features, runlength histograms, and the like. Such features generally entail different costs, which can be computational costs or monetary costs. Optical character recognition (OCR), for example, which is used to identify the words in the sample for computing word frequency or other textual features, can be both computationally and financially costly. The computational cost of performing OCR on a single document page can be from a few hundred milliseconds to a few seconds, depending on the number of words/characters on the page as well as on the quality of the document. For run-length histograms, the computational cost of extracting this type of feature is much lower, on the order of a few tens of milliseconds per page. In terms of monetary cost, there may be license fees or equipment running costs for the feature extraction technology.

A problem which arises is that there is often a trade-off between the costs associated with the extraction of features and their accuracies. Sometimes, for practical reasons, those features which lead to the best accuracy cannot be included in production because their cost is too high. This can result in a loss of information and in a degradation of the classification accuracy. For example, the computational cost associated with OCR may make the use of textual features impractical in document workflows where the scanning rate is high, even though it may provide higher accuracy than available non-textual classification methods.

The present embodiment provides a system and method which enable a more costly feature or features to be employed during training while using a less costly feature or features at test time which can yield more accurate results than when using only the less costly feature(s) during training.

INCORPORATION BY REFERENCE

The following references, the disclosures of which are incorporated herein by reference in their entireties, are mentioned:

Methods for generating representations of images based on layout features, such as text document images, are disclosed, for example, in U.S. Pub. No. 20110022599, published Jan. 27, 2011, entitled SCALABLE INDEXING FOR LAYOUT BASED DOCUMENT RETRIEVAL AND RANKING, by Boris Chidlovskii, et al.

Methods for generating representations of images based on runlength histograms are disclosed, for example, in U.S. Pub. No. 20100092084, published Apr. 15, 2010, entitled REPRESENTING DOCUMENTS WITH RUNLENGTH HISTOGRAMS, by Perronnin.

Methods for generating representations of images based on visual features extracted from patches of an image are disclosed, for example, in U.S. patent application Ser. No. 12/859,898, filed on Aug. 20, 2010, entitled LARGE SCALE IMAGE CLASSIFICATION, by Florent Perronnin, et al., and the references cited therein.

Methods for generating representations of images based on textual features are described, for example, in U.S. Pub. No. 20100082615, published Apr. 1, 2010, entitled CROSS-MEDIA SIMILARITY MEASURES THROUGH TRANS-MEDIA PSEUDO-RELEVANCE FEEDBACK AND DOCUMENT RERANKING, by Clinchant, et al., and U.S. Pub. No. 20110137898, published Jun. 9, 2011, entitled UNSTRUCTURED DOCUMENT CLASSIFICATION, by Albert Gordo, et al.

BRIEF DESCRIPTION

In accordance with one aspect of the exemplary embodiment, a training method for a classification system is provided. The method includes, for each of a first set of training samples, providing a first view of the training sample and a second view of the training sample, each of the first and second views being defined in a respective original feature space. An embedding function for embedding the first view of the training samples in the first set into a common feature space with the second view is learned, for example, with a computer processor. For each of a second set of training samples, the first view of the training sample and a label selected from a finite set of labels are provided. The first view of each of the training samples in the second set is embedded into the common feature space using the embedding function. A classifier is trained using the first view of each the training samples in the second set which has been embedded in the common feature space and the respective label. This is performed without using the second view of the labeled training samples embedded in the common feature space.

In another aspect, a classification method includes providing a classifier which has been trained on labeled training samples generated by embedding a first view of each of the labeled training samples into a common feature space. The embedding is performed with an embedding function which has been learned using a set of views including both the first and second views of the training samples. For a test sample, the first view of the test sample is generated. Each of only a subset of the set of views of the test sample is embedded into the common feature space with the embedding function, the subset including the first view (but not the second view). A label is predicted for the test sample. The predicting includes classifying the test sample with the trained classifier based on the embedded first view.

In another aspect, a classification system includes an embedding component which has been trained to embed the first view of a test sample into a common feature space, the embedding function having been learnt on the first view and a second view of each of a set of training samples. A labeling component labels the test sample which has been embedded into the common feature space. The labeling component uses a classifier which has been trained based on the first view of labeled training samples embedded into the common feature space but not on the second view of any of the labeled training samples. Optionally, a partitioning component partitions views of samples into a first set of views and a second set of views, the first set of views comprising at least the first view and the second set of views comprising at least the second view. A processor implements the embedding component and labeling component and, optionally, the partitioning component.

DETAILED DESCRIPTION

Aspects of the exemplary embodiment relate to a system and method for classification of samples, such as digital images, and in particular, document images, assuming a finite set of classes. The classification problem is addressed from a multiple view perspective in which the samples to be classified are described in two or more different manners ("views").

By way of example, the samples to be classified are scanned pages in a document workflow where each image of a respective page can be described by different views, each view being the product of different features, e.g., textual, visual, and/or layout features. The different views are thus different representations of the same image data.

The exemplary system and method rely on different sets of views for training samples and for test samples to be labeled, the two sets of views being at least partially overlapping, i.e., have at least one view in common. In the training stage, training samples are provided which are each represented by two or more different views, one or more of which may be considered a "costly" view, while at least one other view is a "cheap" view. The "cheap" view is generally less expensive (financially and/or computationally) to generate than the costly view, although, on its own, it may not characterize the data as well as the costly view. At test time, at least one of these views is absent. However, although the "costly" features may not be available at test time, they can be used during the training process to strengthen the accuracy of the "inexpensive" features.

In the exemplary embodiment, a quantitative cost can be associated with each of the views. This cost can be a computational cost, a monetary cost or a combination of both. The views can then be partitioned into two disjoint subsets: 1) "costly" views which can be available at training time but not at test time and 2) "cheap" views which are available at both training and test time. The costly features are then used to improve the cheap features during the training process. As will be appreciated, the additional views used in training need not necessarily be more costly than the views used at test time. For example, a benefit in accuracy may still be achieved by using two or more cheap views in training. Or, a supplier of a classification system may wish to use a view at training time that the supplier would like to keep confidential. For convenience of description, however, the view(s) used in training but not at test time are referred to as the costly view(s), and the view(s) used at both training and test time are referred to as the cheap view(s).

The results shown below demonstrate that use of both cheap and costly views during training can lead to a sizable improvement in accuracy compared to the case where only the cheap view(s) are used.

Figure 1:
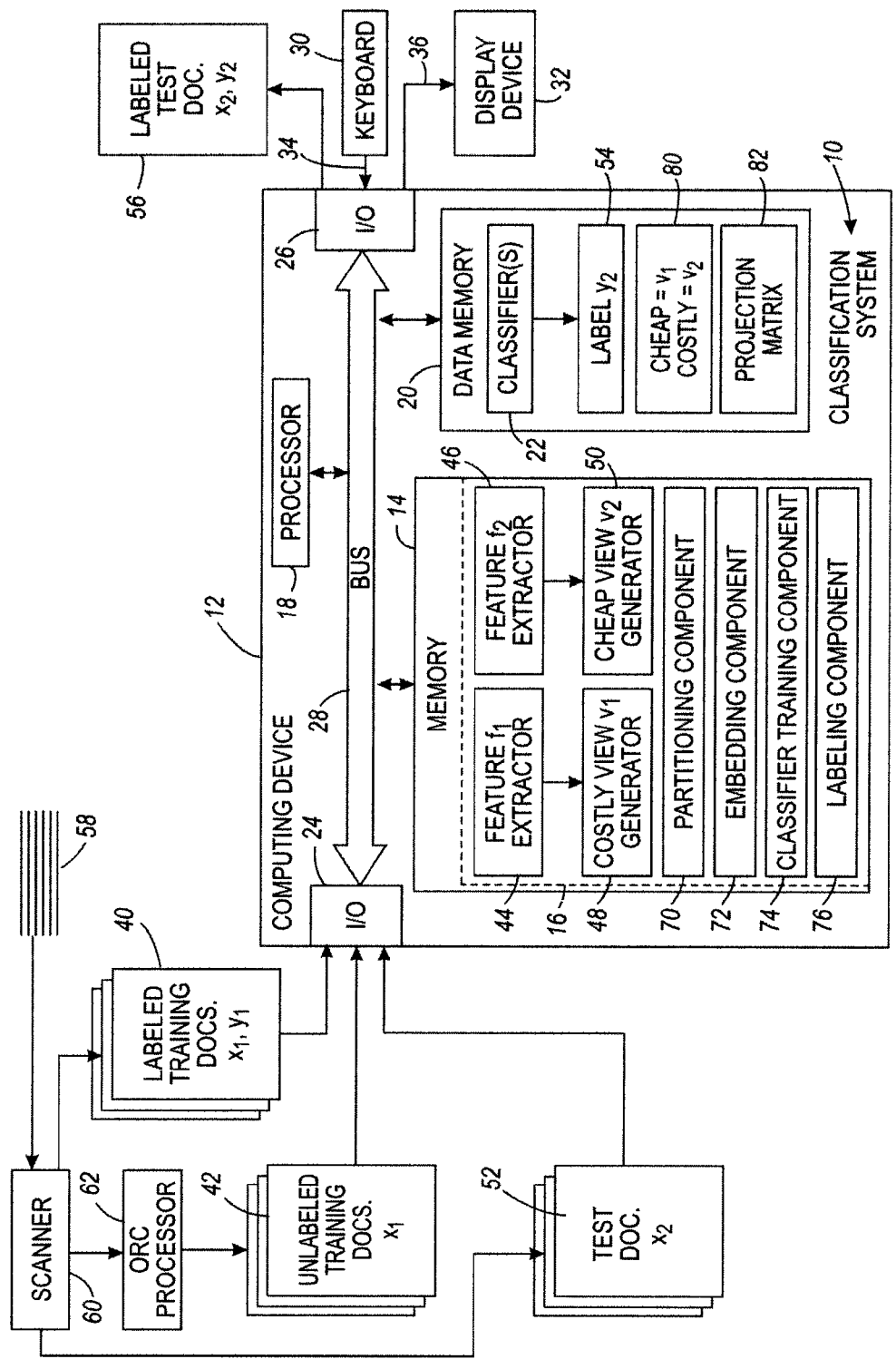
FIG. 1 is a functional block diagram of a classification system in accordance with one aspect of the exemplary embodiment.

With reference to FIG. 1, an exemplary environment in which a classification system 10 operates is illustrated. The classification system is in the form of one or more computing devices 12 and includes main memory 14 which stores instructions 16 for performing the exemplary method and a processor 18, such as the computer's CPU, in communication with the memory, for executing the instructions. Data memory 20 of the computing device stores one or more classifiers 22. The computing device 12 includes one or more input/output devices 24, 26 for communication with external devices. Hardware components 14, 18, 20, 24, 26 of the system communicate via one or more data/control buses 28.

The system 10 may receive user inputs from a user input device 30, such as a keyboard, keypad, touch screen, cursor control device, or combination thereof, and may output information to a display device 32, such as a computer monitor. As will be appreciated, the input and display devices 30, 32 may be associated with a client computing device (not shown) that is linked to the computer 12 via a network, such as a wired or wireless network, or may be linked directly to the computer 12, by wired or wireless connections 34, 36, as shown.

The system 10 has access to training data 40, 42 which, in the exemplary embodiment, includes a set 40 of labeled samples, such as scanned document pages, which are each manually labeled with a respective label ($y_1$), each label generally corresponding to a respective one of a finite set of classes, and a set of unlabeled samples 42, such as scanned document pages, which have not been labeled with any class. In one embodiment, the training data 40, 42 may be input to the system 10 as document page images, and the system 10 may include feature extraction components 44, 46 for extraction of the costly and cheap features, respectively, for each page, and corresponding view generation components 48, 50, for generation of a respective view $v_1$, $v_2$ (representation) of each training sample in a respective feature space, based on the extracted features. As will be appreciated, while two feature extractors 44, 46 and two view generators 48, 50 are shown, more of each type may be provided where more feature types are employed. Additionally, it is contemplated that the same view generator may be used to generate different views, based on different extracted features. In another embodiment, the views $v_1$, $v_2$, etc. and/or the features on which they are based, may be generated elsewhere and input to the system 10 in place of the original sample (e.g., image data) itself. The training data 40, 42 is used to train the classifier model(s) 22. Thereafter, given an input, unlabeled test sample 52 to be labeled, the trained classifier model 22 is used to predict a label 54 for the test sample, based on fewer than all of the views available at training time (e.g., only using the cheap view $v_2$, which has been embedded, as described below, in a new, common feature space (which may also be referred to herein as an embedding space or subspace), and a labeled test sample 56 is output.

The samples 40, 42, 52 can be input to the system 10 from any suitable external source, such as a scanner, workstation, database, memory storage device, such as a disk or flash memory, or the like, and may be stored in memory 20 during processing. The computing device 12 may be linked, via a wired or wireless link from input/output device(s) 24, 26, to one or more external computing devices (not shown) from which samples are received and/or to which labeled samples 56 are output.

In one exemplary embodiment, samples 40, 42, 52 are digital copies of hardcopy documents 58 that are output from a scanner 60. Samples 40 may be processed by an OCR processor 62 prior to being input to the system 10. In another embodiment, an OCR processor 62 may be incorporated in the system 10, e.g., as software stored in memory 14 which is executed by processor 18. In some embodiments, OCR processor 62 and/or the system 10 may be incorporated into the scanner 60.

The computing device 12 may include one or more specific or general purpose computers, such as a server computer, PC, such as a desktop, a laptop, tablet, or palmtop computer, a portable digital assistant (PDA), mobile phone, or other computing device capable of performing one or more of the exemplary methods disclosed herein. In some embodiments, the system 10 may be partly resident on a client device in communication with computing device 12.

The digital processor 18 can be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2 and/or 3, can be used as the processor. The memory or memories 14, 20, which may be separate or combined, may represent any type of non-transitory computer readable medium such as random access memory (RAM), read only memory (ROM), magnetic disk or tape, optical disk, flash memory, or holographic memory. In one embodiment, the memory 14, 20 comprises a combination of random access memory and read only memory. Exemplary memory 14, 20 stores instructions for performing the exemplary method and data used and generated therein, as well operating instructions for operating the computer 12.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As the samples 40, 42, 52 used in training and testing, images may be received by the system 10 in any convenient file format, such as JPEG, GIF, JBIG, BMP, TIFF, PDF, or the like or other common file format used for images and which may optionally be converted to another suitable format prior to processing. Input images may be stored in data memory 20 during processing. The images may be individual images, such as scanned document images, photographs, video images, or combined images which include photographs along with text, and/or graphics, or the like. In general, each input digital image 40, 42, 52 includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). Image data may be binarized (converted to black and white) prior to feature extraction and, in the case of text features, may be OCR processed to identify the words (and other OCR-identifiable characters and groups of characters) contained within the document page.

Formally, the classification can be considered as a supervised or semi-supervised classification problem. In the case of a supervised classification problem, given a set 40 of labeled samples $\{(x_i, y_i), i=1 \ldots N\}$, where $x_i$ denotes the samples and $y_i$ the labels, the goal is to learn at training time a set of one or more classifiers 22 which will be used to perform prediction on unlabeled samples 52 at test time. When additional unlabeled data 42 is available, the problem is considered semi-supervised. In both embodiments, the training samples $x_i$ are described in multiple manners, i.e., with independently generated views of the same data. In exemplary embodiment, the samples 52 to be labeled are scanned pages in a document workflow, i.e., the $x_i$'s are document images and the $y_i$'s correspond to page categories selected from a finite set of page categories.

The classes into which the samples are to be classified by the classifier 22 and the type of features extracted may depend on the application. For example, in a corporate mailroom, where incoming mail is scanned before distribution to appropriate departments, the object may be to classify each document page as an invoice, letter, payment voucher, or the like, so that the pages can then be distributed to different departments or processed in different ways. In this case, OCR features may be particularly useful, but too costly for use at test time, at least in the case of a highly accurate OCR system 62. In a government office, where hardcopy files are being converted to digital form, the object may be to provide each paper in the file with a label for a respective class, such as a particular type of government form. Here, layout features may be particularly useful.

It is to be understood that different views can be independently generated using the same general type of feature. For example, different types of OCR software come with different associated costs, and can produce higher or lower qualities of output. Thus, in some embodiments, two of the views used in training may be generated, for example, on the outputs of two different OCR systems (the features of both being, for example, histograms of word frequencies), and only the cheaper of the two is used at test time.

The exemplary system 10 includes various components 70, 72, 74 for performing the classifier training. These may be in the form of software instructions in memory 14, which are executed by processor 18. In particular, a partitioning component 70 partitions the views available for use at training time into cheap and costly views, e.g., based on user information and/or using automated evaluation methods. For example, partitioning component 70 may assign at least one feature extraction process as costly and at least one as cheap, based on user input cost information and/or automated computation methods. In the assignment is performed entirely manually, component 70 may be omitted. An embedding component 72 includes an algorithm for learning embedding functions whereby cheap and costly views are embedded into a common feature space. A classifier training component 74 trains the classifier 22 on the cheap view(s) of labeled training samples 40, which have been embedded into the common feature space. Once trained, a labeling component 76 uses the classifier 22 to assign labels to unlabeled samples 52. As will be appreciated, while for convenience, the components 44, 46, 48, 50, 70, 72, 74, 76 are all shown as being resident on the same computing device, it is to be appreciated that they may be distributed over two or more computing devices and may be combined or separated into fewer or more components.

Figure 2:
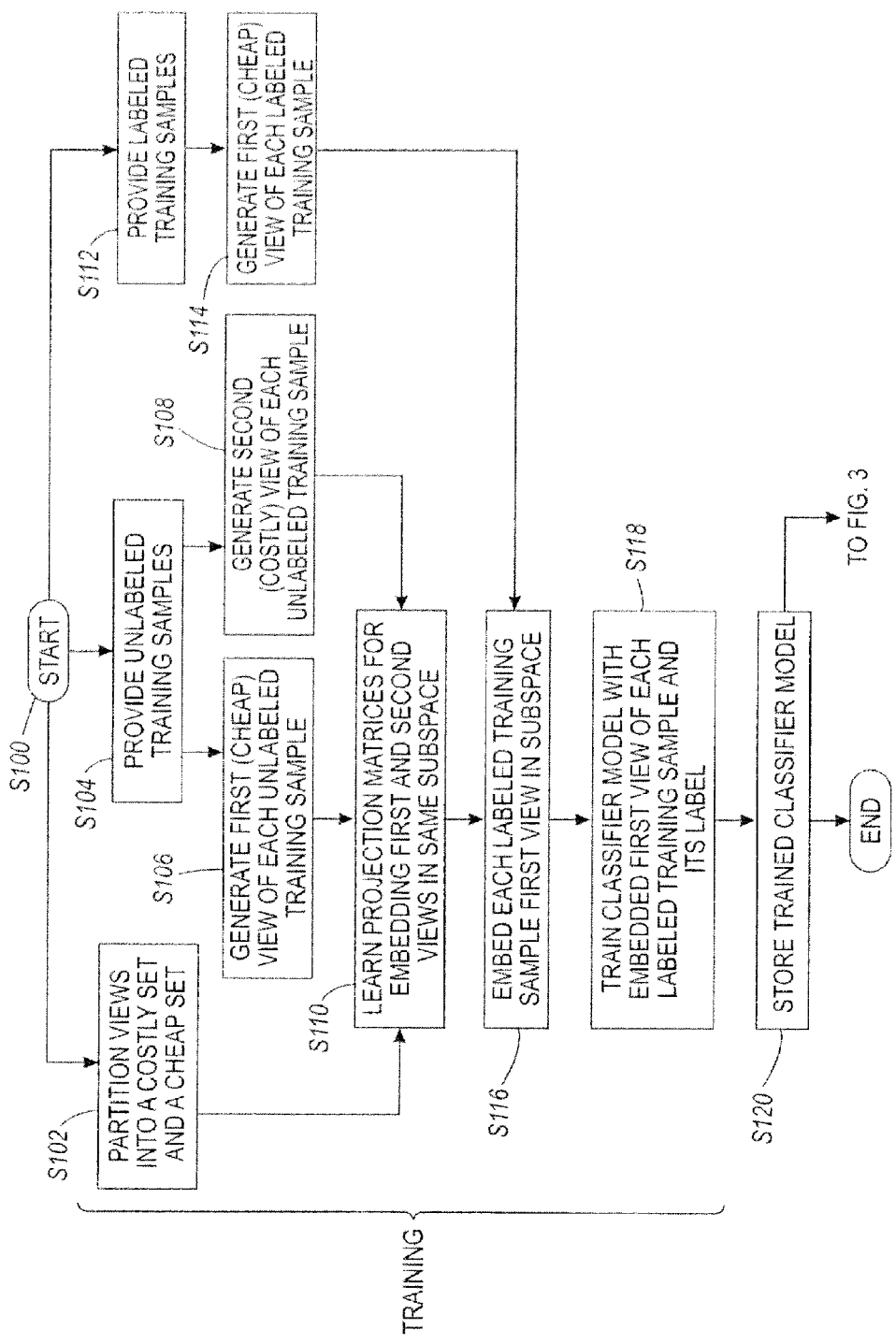
FIG. 2 is a flow chart of a method for training a classification system in accordance with another aspect of the exemplary embodiment.

FIG. 2 illustrates a classifier training method in accordance with one aspect of the exemplary embodiment, which can be performed with the system 10 of FIG. 1. Briefly, the training phase may include three steps: i) partitioning of the views into "costly" and "cheap" views, ii) unsupervised learning of a set of projection matrices (one per view) to embed all views (or at least the cheap ones) in the same subspace, and iii) supervised learning of the classifier(s) on the embedding of the cheap views.

The method begins at S100.

At S102, views in a predefined, finite set of views are partitioned into disjoint sets: i.e., a set of costly views comprising one or more of the views and a set of cheap views comprising one or more of the views, with no overlap between the two sets of views. The partitioning information 80 (FIG. 1) is received into memory 20.

At S104, a set 42 of multiple, (un)labeled training samples is provided.

At S106, at least one cheap view $v_1$ is generated for each of the unlabeled training samples 42 in a first, original feature space. At S108, at least one costly view $v_2$ is also generated for each of the unlabeled training samples 42 in a second, original feature space. Each of the original views $v_1$, $v_2$ may be independently generated by first extracting a respective type of feature from the training samples and then generating a view (representation), based on the extracted features, each view being defined in the respective original feature space.

At S110, embedding functions, such as projection matrices, for embedding the cheap (and costly views) of the data into the common feature space are learned. At least the projection matrix 82 learned for embedding each of the cheap views is stored in memory.

At S112, a set 40 of multiple, labeled training samples is provided.

At S114, at least one cheap view $v_1$ is generated for each labeled training samples 40.

At S116, the cheap view $v_1$ of each of the labeled training samples 40 is embedded into the subspace with the projection 82 matrix already learned at S110. As will be appreciated, if the training samples in set 42 are all labeled, steps S112-S116 can be incorporated into step S104-S110. However, using unlabeled training samples for learning the embedding increases the number of samples which can be used without being overly time-consuming in the labeling.

At S118, the classifier model 22 is trained with the embedded cheap view(s) $v_1$ of each of the labeled training samples 40 and the corresponding label. Where more than one cheap view is used, the embedded cheap views can be combined, e.g., concatenated, and the combination used to train the same classifier (e.g., one classifier for each class). Or, the two or more the embedded cheap views may be used to train separate classifiers, such that in use, the classification results are then combined.

At S120, the trained classifier 22 (e.g., one classifier model for each class or a multiclass classifier) is stored in memory 20.

The training phase ends at S122. The method may then proceed to the testing phase, as illustrated in FIG. 3.

Figure 3:
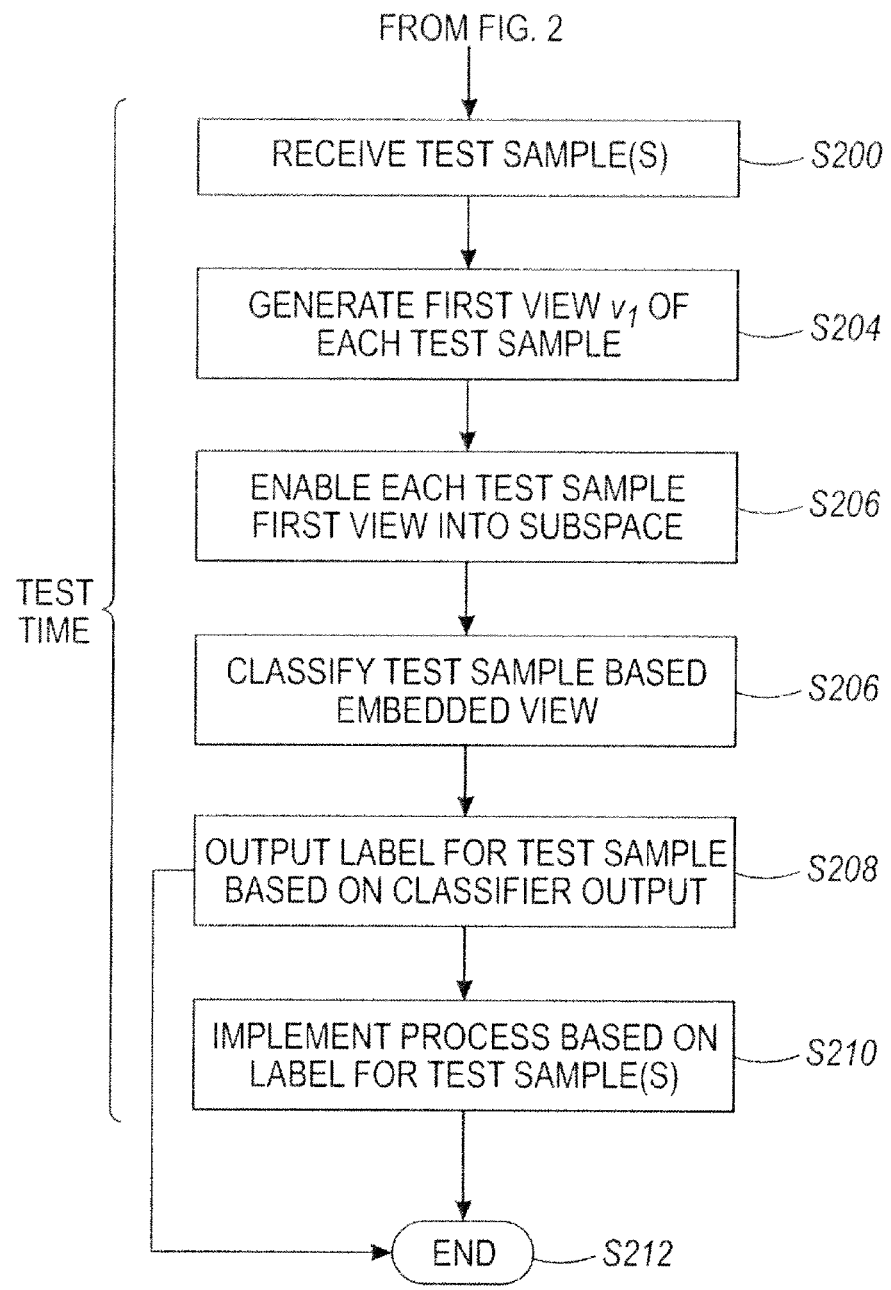
FIG. 3 is a flow chart of a method for use of the trained classification system in accordance with another aspect of the exemplary embodiment.

Turning now to FIG. 3, the testing phase assumes that a classifier 22 has been generated, as described with reference to FIG. 2, and stored in memory.

At S200, a test sample 52 to be labeled, such as a scanned document page, is received.

At S202, a cheap view (or two or more cheap views) is generated of the test sample 52 by extraction of the appropriate feature type, in the same manner as for the cheap view(s) of the training samples 40, 42. No costly features are extracted for generating the costly view of the test sample 52 and thus a costly view is not generated.

At S204, using the stored projection matrix 82 learned at S110, the cheap view of the data 52 is embedded into the subspace.

At S206, the test sample 52 is classified with the trained classifier(s) 22, based on the embedded view generated at S204.

At S208, a label 54 is assigned to the test sample 52, based on the classifier output. In one embodiment, a single, most probable label is assigned. In other embodiments, multiple or all of the labels may be probabilistically assigned to the sample 52. The labeled test sample 56 (or simply the label 54) is then output.

At S210, a process may be implemented automatically, based on the label 54 assigned at S208. For example, in the case of scanned documents, the class label of a document page, or multiple scanned document pages, may determine the department of a company to which it is sent for further processing, or may determine who has access rights to the document, or where it is stored in memory, how it is to be subsequently processed (e.g., with a more costly OCR processing system) or the like.

The method ends at S212.

The method illustrated in FIG. 2 and/or FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2 and/or 3, can be used to implement the method.

Further details of the system and method will now be described.

A Partitioning of Views (S102)

It is assumed that a set of K possible views denoted $V=\{v_k, k=1 \ldots K\}$ is available and that only a subset T of these views will be used at test time.

First, a partitioning of these K views into 2 disjoint subsets T and R is performed. T contains the set of views whose cost (e.g., computational and/or monetary) is acceptable at training time but not at test time while R contains the set of views whose cost is acceptable at both training time and test time. $K_T$ is used to denote the number of views in T and $K_R$ the number of views in R.

Such a partitioning may be achieved using simple rules such as: put in T all the views whose cost is above a threshold θ and in R all those views whose cost is below the threshold. This threshold θ may be application dependent and may be defined according to target costs.

The cost may be determined for example, by determining the computational cost, e.g., based on time, involved in computing the view, e.g., for a sampling of training samples.

In some embodiments, the partitioning may be performed and/or refined by a human operator.

B. Feature Types and Views (S106, S108, S114, S202)

Document images 40, 42, 52 can be described, among others, by representations, such as vectors, graphs, or any other representation in which a similarity between two representations can be computed. Elements of the representations are based on one or more features. Suitable features include:

1. Textual features: these are features related to characters (letters, numbers) and character strings (e.g., words) extracted from the document image. For example, bag-of-word histograms may be computed on the output of an OCR system. See, for example, G. Salton and M. McGill, Introduction to Modern Information Retrieval, McGraw-Hill, 1983; and U.S. Pub. Nos. 20100082615 and 20110137898. The textual content is optionally preprocessed to produce a defined starting point. The preprocessing may include, for example: tokenization; lemmatization; word decompounding; stopword removal; or so forth. A bag-of-words representation of pre-processed texts is generated. The bag-of-words representation represents the document in terms of word counts or frequencies, typically without regard to word ordering. Text features may include, for example, occurrences of particular words or word sequences, and the like. Each of a set of recognizable words (and/or phrases) can thus be a feature, and the feature value is, or is based on, a count of the number of occurrences of the word/phrase. Very frequent words, (e.g. words such as "and" or "the") may be excluded from the set because they are often not helpful in characterizing documents. Additionally, rare words may also be excluded.

For example, a bag-of-words representation can be used, where each word serves an element of a features vector whose value is based on a frequency of occurrence of the word in the document page. This may serve as the view. Text features are typically useful in the case of document pages that are electronically generated or that have been optically scanned followed by OCR processing so that the text of the page is available.

2. Visual features: These are features relating to color, texture, or the like of pixels of the image. For example, run-length histograms, optionally at multiple scales, can be computed as described, for example, in above-mentioned U.S. Pub. No. 20100092084. A runlength histogram is a histogram of the occurrences of runlengths, where a runlength is the number of successive pixels in a given direction (a row) in an image (e.g., a scanned image page) that belong to the same quantization interval. A bin of the runlength histogram may correspond to a single runlength value (such as 1, 2, 3, 4, or 5 etc. pixels), or a bin of the runlength histogram may correspond to a contiguous range of runlength values (such as 1-2, 3-4, 5-6, 7-10, 11 or more, etc. pixels). In the case of a binary images, only two quantization levels are considered, ON and OFF. In the features vector, the runlength histogram may be treated as a single element of the features vector, or each bin of the runlength histogram may be treated as an element of the features vector.

Other visual features which can be used herein are based on gradient and/or color features extracted from patches of a document, i.e., using two dimensional areas of the document image rather than the one dimensional runlengths used in the runlength histograms. Extraction of such features, and generation of a representation based thereon, may be as described, for example, in one or more the following references, the disclosures of which are incorporated herein by reference in their entireties: U.S. Pub. Nos. 20030021481; 2007005356; 20070258648; 20080069456; 20080240572; 20080317358; 20090144033; 20100040285; 20100098343; 20100191743; 20100189354; 20100318477; 20110040711; 20110026831; 20110091105; U.S. application Ser. No. 12/693,795, filed on Jan. 26, 2010, entitled A SYSTEM FOR CREATIVE IMAGE NAVIGATION AND EXPLORATION, by Sandra Skaff, et al.; U.S. application Ser. No. 12/859,898, filed on Aug. 20, 2010, entitled LARGE SCALE IMAGE CLASSIFICATION, by Florent Perronnin, et al.; U.S. application Ser. No. 12/890,789, filed on Sep. 27, 2010, entitled IMAGE CLASSIFICATION EMPLOYING IMAGE VECTORS COMPRESSED USING VECTOR QUANTIZATION, by Jorge Sanchez, et al., Perronnin, F., Dance, C., "Fisher Kernels on Visual Vocabularies for Image Categorization," in Proc. of the IEEE Conf. on Computer Vision and Pattern Recognition (CVPR), Minneapolis, Minn., USA (June 2007); Herve Jegou, Matthijs Douze, and Cordelia Schmid, "Improving Bag-Of-Features for Large Scale Image Search," in IJCV, 2010; F. Perronnin, J. Sánchez, and T. Mensink, "Improving the fisher kernel for large-scale image classification," in ECCV 2010.

3. Layout features: these relate to the way in which information is laid out on a page and may include, for example, one or more of: the location, size, and/or other attributes of text blocks, and a measure of page coverage (e.g., 0% indicating a blank page and increasing values indicating a higher fraction of the page being covered by text, drawings, or other markings). As an example, bags-of-blocks, as described in U.S. Pub. No. 20110022599, the disclosure of which is incorporated herein in its entirety by reference, may be used. In this embodiment, layout blocks (e.g., rectangular areas defined by x and y dimensions and their page location) are extracted from a set of training documents and are clustered into a plurality of layout block clusters (i.e., each extracted layout block is assigned to only one of the clusters). A representative block for each of the layout block clusters is computed. A document page can then be characterized based on the layout blocks of the document page and the computed representative blocks of the clusters to which the document layout blocks are assigned. The view generated can thus be a vector in which each element represents a representative block and its value represents the number of blocks assigned to that cluster.

Typically, there is a trade-off between the costs associated with each view and their respective accuracies. As noted above, the computational cost of performing OCR on a single document page for extracting textual features can be higher than the cost of extracting run-length histograms. The monetary cost associated with OCR licenses can also be high. Although one or more of these types of feature may not be available at test time, they can be used at training time to learn better features.

C. Unsupervised Learning (S110)

The different views of the data 42 are embedded in the common feature space (which can be either a new feature space or the same, original feature space as that in which the view employing costly features is defined). Assume that there are M unlabeled samples $\{x_i, i=1 \ldots M\}$ to learn the embedding. The number of unlabeled samples 42 available to learn the embedding can be much larger than the number N of labeled samples available to learn the classifiers (i.e. M>>N). For example, the number of unlabeled samples is at least 5 times, such as at least 10 times or at least 50 times the number of labeled samples. In general, all views (both "cheap" and "costly") have been extracted from all unlabeled samples.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

1. Example Case of Two Views

In the case of only two views, it is assumed that one is a "costly" view in T and one a "cheap" view in R. For these two views, it is assumed that the samples can be described by vectors with respectively $d_1$ and $d_2$ dimensions. Modifications to these restrictions will be addressed later.

A transformation (embedding function) is then learned to embed each feature (vector dimension) of the cheap view into the new subspace into which the costly features can also be embedded (or in one embodiment, the subspace is the same subspace as that of the costly features). The subspace is a finite set of features combined from among all features, which set of features is not identical to the set of features used for the cheap view. The embedding results in the assignment of a value to each of these subspace features for the cheap view of each training sample and for the corresponding costly view. An aim of this embedding is to maximize some measure of correlation between the two embedded views, e.g., to maximize, over all pairs, the similarity between the pairs of representations in the subspace.

In one embodiment, the correlation is maximized using Canonical Correlation Analysis (CCA) to perform the embedding. CCA is a well-known tool for the analysis of multi-view data, which was first introduced by Harold Hotelling in 1936. CCA and its variants have been used, for example, in unsupervised tasks such as retrieval (see, D. Hardoon, S. Szedmak, and J. Shawe-Taylor, "Canonical correlation analysis: An overview with application to learning methods," Tech Report, Royal Holloway University of London, 2003, hereinafter, Hardoon 2003) and clustering (see, M. Blaschko and C. Lampert, "Correlational spectral clustering," CVPR, 2008, hereinafter, Blaschko 2008). In the exemplary embodiment, however it is applied to a supervised learning problem (document classification) where fewer than all views available at training time are used at test time.

Let A ($d_1 \times M$) and B ($d_2 \times M$) be the representation of the data in the two views, where M represents the number of training samples. Then, CCA finds a projection from each feature space that maximizes the correlation between the projected representations. The projection can be a transform operation, such as a linear operation, which takes a vector (or other representation) in the feature space of the cheap (or costly) view an outputs a vector (or other representation) in the common, one dimensional subspace, i.e., a new set of elements each with a respective value. Maximization of the correlation can be expressed as:

$$\operatorname{argmax}_{a,b} \frac{a'AB'b}{\sqrt{a'AA'a}\sqrt{b'BB'b}} \qquad \text{Eqn. 1}$$

which can be rewritten as:

$$\operatorname{argmin}_{a,b} \|A'a - B'b\|^2, \qquad \text{Eqn. 2}$$

under the constraints a'AA'a=1 and b'BB'b=1.

where A and B are matrixes which include the $d_1$ and $d_2$ dimensional vectors, respectively, a is a $d_1$ dimensional vector that projects the cheap view of a training sample into the common, one dimensional subspace, b is a $d_2$ dimensional vector that projects the costly view of a training sample into the common, one dimensional subspace, a' is the transpose vector of a, and b' is the transpose vector of b, A' is the transpose matrix of A and B' is the transpose matrix of B, a'A is thus the projection of all training samples in the cheap view into the one dimensional subspace, and b'B represents the projection of all training samples in the costly view into the one dimensional subspace.

This equation finds a one dimensional subspace in which the two views are as correlated (similar) as possible. The denominator ($\sqrt{a'AA'a}\sqrt{b'BB'b}$) normalizes the values, preventing excessively large values of a and b being favored in the product.

To obtain a $d_3$ dimensional embedding space (subspace), in the exemplary embodiment, Eqn. 1 is solved $d_3$ times, to obtain projections $a_1, a_2, \ldots a_{d_3}$, and projection vectors $b_1, b_2, \ldots b_{d_3}$, subject to projection vectors $a_1, a_2, \ldots a_{d_3}$, and projection vectors $b_1, b_2, \ldots b_{d_3}$ being uncorrelated.

This is equivalent to solving the following generalized eigenvalue problem:

$$A'B(B'B)^{-1}B'Aa_k = \lambda_k^2 A'Aa_k \qquad \text{Eqn. 3}$$

where $a_k$ represents a set of eigenvector functions indexed by k, representing the eigenvector function that provides the maximum value of Eqn. 1, and $a_2$ the next highest, and so forth up to k, and and $\lambda_k$ represents the eigenvalue associated with the eigenvector $a_k$.

As will be appreciated, for solving b, $a_k$ can be replaced in Eqn. 3 by $b_k$. To solve for $b_k$, the following generalized eigenvalue problem is solved:

$$B'A(A'A)^{-1}A'Bb_k = \lambda_k^2 B'Bb_k$$

However, if $a_k$ and $\lambda_k$ have already been computed, $b_k$ can be easily obtained from them. Only the projections for transforming the cheap view into the subspace need to be stored for later use, however, in the exemplary embodiment.

Many efficient solvers exist for solving Eqn. 3. In some embodiments, this objective function can be regularized by adding a parameter ρ:

$$A'B(B'B+\rho I)^{-1}B'Aa_k = \lambda_k^2 (A'A+\rho I)a_k \qquad \text{Eqn. 4}$$

This addresses the case where a trivial solution can be obtained when A'A or B'B are invertible. A regularization parameter ρ>0 can thus be added to force a non-trivial learning. In the case where a large amount of unlabeled data is available, the regularization may not be necessary, i.e., ρ=0.

For further details on this regularization, see D. P. Foster, R. Johnson, S. M. Kakade, and T. Zhang. "Multi-view dimensionality reduction via canonical correlation analysis," Tech Report, Rutgers University, 2010, hereinafter, Foster 2010.

The output of CCA is a projection matrix per cheap view. The dimensionality of the common subspace in which the views are projected is a parameter of CCA. The output projection matrix for the cheap view, for example, provides a transformation for each element of the cheap view into the element(s) of the costly view.

The use of CCA for the present application results in embedding the data in a common feature space. CCA can be seen as using complex labels (the "costly" view) as a way of guiding feature selection (in the "cheap" view) towards the underlying semantics (see, for example, Hardoon 2003). Such complex labels are generally weaker than true labels. However, provided that they are available in a sufficiently large quantity, they can help the classification task.

2. Extensions

The two restrictions imposed in the above example can be lifted as CCA can be extended:

a) to more than two views. This may be achieved using multiple view CCA. In this case, a transformation is then learned for each view to be embedded in the same common subspace. See, for example, Blaschko 2008.

b) to non-vectorial data using, for example, kernel CCA (KCCA). In this embodiment, the data is such that a kernel can be defined between points. The embedding transformation (e.g., from a graph) can be a linear combination of kernel functions which transforms the data to a vectorial common subspace. See, for example, Hardoon 2003, section 3.2.

It is to be appreciated that techniques other than CCA can be used to perform the embedding. For instance, if A corresponds to the expensive views and B to the cheap views, then another possibility would be to embed the cheap views in the space of the expensive views. This may involve finding a $d_1 \times d_2$ projection matrix P such that:

arg $\min_P \|A - PB\|^2$, which can be under some constraints, e.g., P'P=1 (i.e. P' and P are orthogonal).

This is a typical least squares regression problem. Note that other variations (e.g. using other constraints) are possible.

D. Supervised Learning (S112-S118)

At S114, for each labeled sample 40 all its "cheap" views in R are extracted (but not its "costly" views which are not considered in what follows). At S116, each view in R is embedded in the common subspace. Let $X_{i,r}$ denote the feature vector associated with the r-th view of $x_i$ and let $P_r$ denote the projection matrix associated with the r-th view (learned at step 2). The embedding of a view entails computing $P_r x_{i,r}$.

For example, assume in a very simple case the feature vector associated with the r-th view is (4, 3, 1) and the projection matrix $P_r$ is, $$\begin{pmatrix} 0.1 & 0.2 & 0.1 \\ 0.0 & 0.2 & 0.0 \\ 0.3 & 0.0 & 0.1 \\ 0.0 & 0.1 & 0.0 \end{pmatrix}$$

Then the embedded vector is:

$$\begin{pmatrix} 0.1 & 0.2 & 0.1 \\ 0.0 & 0.2 & 0.0 \\ 0.3 & 0.0 & 0.1 \\ 0.0 & 0.1 & 0.0 \end{pmatrix} \begin{pmatrix} 4 \\ 3 \\ 1 \end{pmatrix} = \begin{pmatrix} 0.1 \cdot 4 + 0.2 \cdot 3 + 0.1 \cdot 1 \\ 0.0 \cdot 4 + 0.2 \cdot 3 + 0.0 \cdot 1 \\ 0.3 \cdot 4 + 0.0 \cdot 3 + 0.1 \cdot 1 \\ 0.0 \cdot 4 + 0.1 \cdot 3 + 0.0 \cdot 1 \end{pmatrix} = (1.1 \quad 0.6 \quad 1.3 \quad 0.3)$$

A feature vector serving as an original view, in the exemplary embodiment, is generally much larger than the 3 dimensions in this example, such as at least 500 or at least 1000 dimensions and can be up to 1 million dimensions or more.

The embedded view can be of the same number of dimensions or larger or smaller than the original view. Since all views are embedded into the same subspace, in the exemplary embodiment, the embedded views are typically all of the same number of dimensions. For example, the embedded views can be at least 400 dimensions, such as at least 500 dimensions, and can be up to 10,000 dimensions, such as up to 1000 or up to 1500 dimensions. In the exemplary embodiment, the number of dimensions in the embedded views can each be less than the number of dimensions of all of the original views. As will also be appreciated, feature vectors are often expressed in a binary form, with each feature (dimension) occupying several bits, and thus the vector stored in memory can be more complex than in this simplified example.

In the case of multiple cheap views, the final vector to be input to the classifier can be a function of the embedded vectors generated for each of the cheap views. For example, the function used to generate the vector to be input to the classifier may be the concatenation, average, or product of the different embeddings (see, for example, Foster 2010). In the exemplary embodiment, where there is more than one cheap view, the learned embedding function embeds the two or more cheap views into the same common subspace. Where only one first view is used, the combination of two or more vectors is obviously not needed.

Then, at SS118, traditional supervised learning can be performed on these representations. Any suitable supervised learning method can be used, such as Bayesian classifiers, decision trees, Support Vector Machines (SVMs), and the like. In the example below, linear SVMs are used, but it is to be appreciated that other linear or non-linear classifier learning methods could be used. The classifier training involves learning parameters of a classifier model which can then be used to predict a label for an unlabeled sample, based on its embedded representation in the subspace. In the exemplary embodiment, one classifier is learned for each class which outputs a prediction of whether a sample should be labeled with that class, although multiclass classifiers could be employed.

The exemplary embodiment is feasible even when only a limited amount of labeled training data is available, for example, when there are no more than 20 or 10 labeled samples available for each class, or even fewer, such as no more than 6 or no more than 5, or even less.

E. Testing

The test procedure described in FIG. 3 can employ the following steps. Given an unlabeled test sample $x_i$:

i) Extract the features $x_{i,r}$ of $x_i$ associated with the $K_R$ views of R (S202), as described above for S114.

ii) Embed each view by $P_r x_{i,r}$ and concatenate or otherwise combine when there are more than two cheap views (S204), as described above for S116.

iii) Perform prediction on the (concatenated) vector (S208), by inputting the concatenated vector into the trained classifier model.

Without intending to limit the scope of the exemplary embodiment, the following example demonstrates the effectiveness of the exemplary method.

EXAMPLE

Experiments were performed on a challenging real-world dataset of documents comprising different types of forms. The dataset contains approximately 40,000 documents in 184 classes. Half of the data was used for training and half for testing. The experiment was repeated with 5 training/test partitions and the average is reported.

Two types of features were used: textual features (5000-dimension bag-of-words histograms computed on the output of an OCR system), and visual features (1,680-dimension multi-scale run-length histograms). The first view (textual) was used as the "costly view" while the second one (visual) was used as the "cheap view".

The experiments focused on the more realistic case where a large amount of unlabeled data is available (to learn the CCA projections), while only a small amount of labeled data is available (to learn the classifier(s). In a first experiment, 5 labeled training samples per class were used (FIG. 4) and in a second, 10 labeled training samples per class were used (FIG. 5). The samples were chosen at random from the training set.

For CCA, no regularization was used ($\rho=0$), although it is expected that better results may have been obtained by cross-validating this parameter. For the supervised classification, linear SVMs trained (independently) in a one-vs-all fashion were used. Experiments with a multiclass SVM did not show a measurable improvement on this dataset, although this may not be true for other cases.

For the evaluation, the class with the highest prediction score is assigned to each test image and the number of documents for which this prediction is correct is counted. The average accuracy per class is computed and the mean over the 184 classes is shown in the results.

Two systems were compared: a baseline system, which uses only visual features ("Baseline"), and the exemplary system ("CCA") which also uses textual features at training time but not at test time. For the exemplary system, the number of dimensions in the common subspace (CCA dimensions) was varied between about 100 and 1400.

Figure 4:
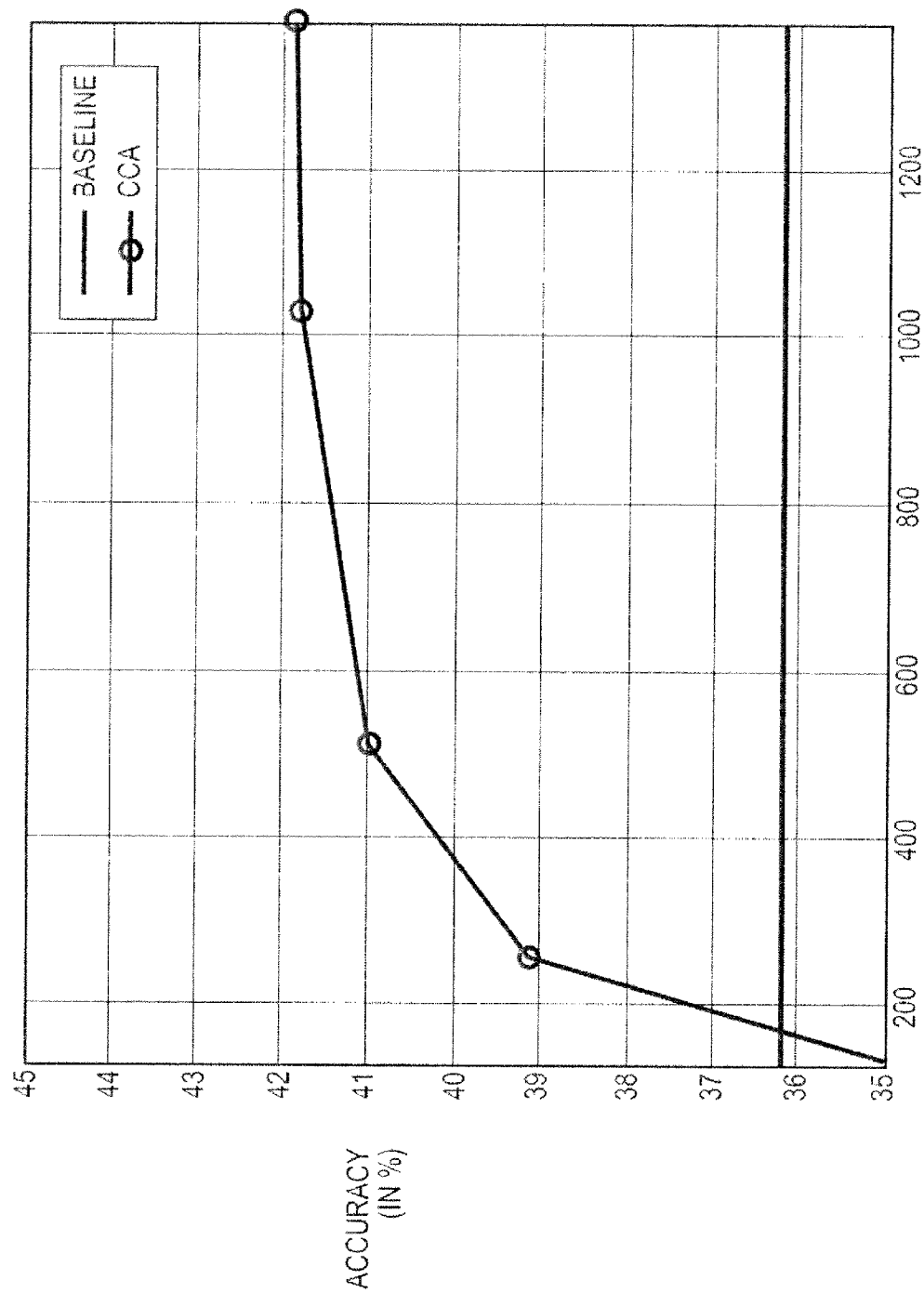
FIG. 4 is a plot of accuracy vs. number of dimensions using five labeled training samples per class.
Figure 5:
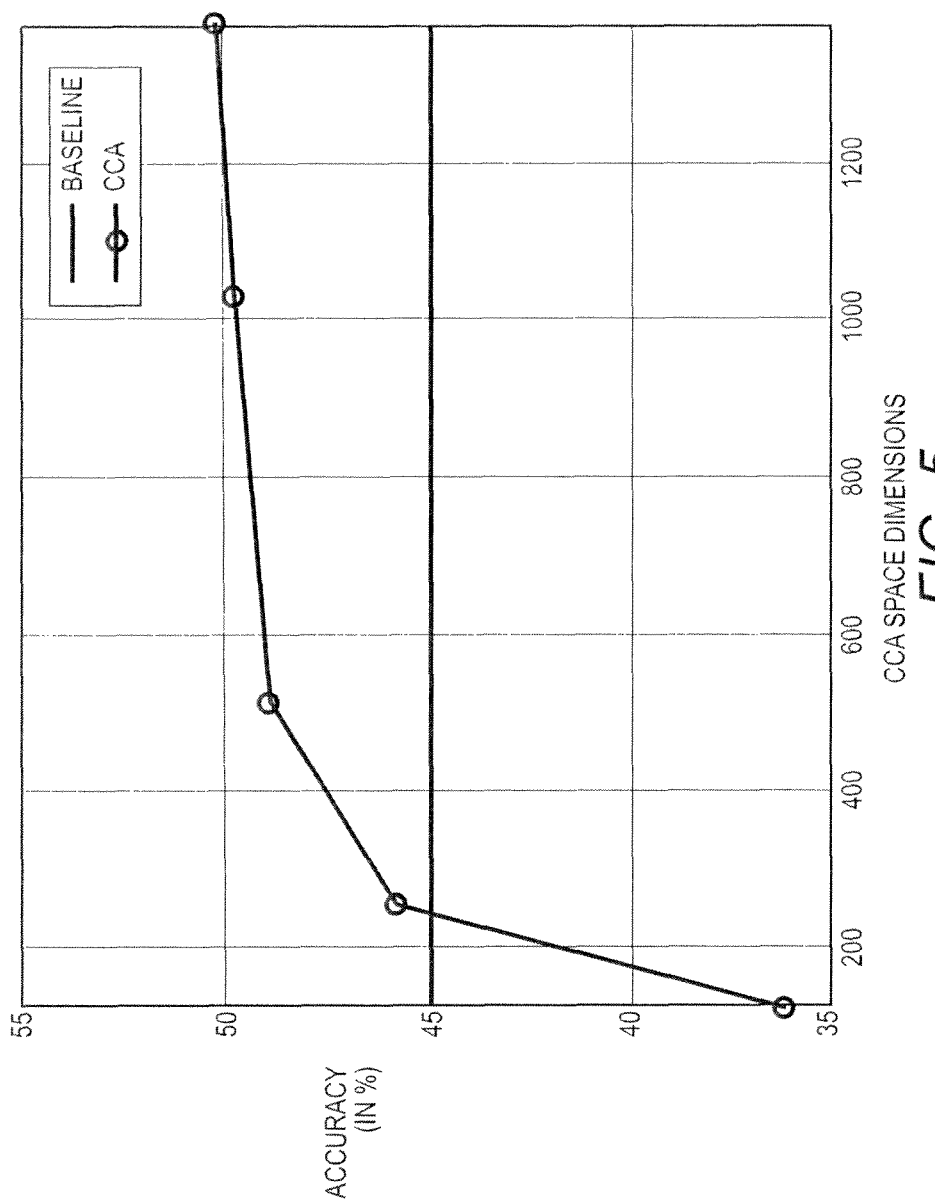
FIG. 5 is a plot of results of accuracy vs. number of dimensions using ten labeled training samples per class.

As can be seen from FIGS. 4 and 5, the exemplary method provides a substantial improvement over the purely visual Baseline. For 5 labeled training samples, the accuracy increases from approximately 36% to 42% and for 10 labeled training samples, from approximately 45% to 50%. For example, with only 512 dimensions (approximately one third of the original number of dimensions of the visual features), the performance is quite close to the maximum. This means that an additional advantage of the present method is that classification can be performed in a subspace with reduced dimensionality, as compared to each of the original feature spaces of the two views. The linear value for the baseline is because only one value was obtained for the 5000 dimensions employed.

The results demonstrate that the "cheap" view can benefit from the "costly" view, even when the second one is not available at test time.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A training method for a classification system comprising:
   for each of a first set of training samples, providing a first view of the training sample and a second view of the training sample, each of the first and second views being defined in a respective original feature space;
   with a computer processor, learning an embedding function for embedding the first view of the training samples in the first set into a common feature space with the second view of the training samples,
   for each of a second set of labeled training samples, providing the first view of the labeled training labeled sample and a label selected from a finite set of labels;
   embedding the first view of each of the labeled training samples in the second set into the common feature space using the embedding function to generate embedded first views of the labeled training samples;
   training a classifier based on the embedded first view of each the labeled training samples in the second set which has been embedded in the common feature space and the respective label, without using the second view of the labeled training samples embedded in the common feature space.

2. The method of claim 1, wherein the training samples in the first and second sets are document images.

3. The method of claim 1, wherein the first and second views comprise vectors.

4. The method of claim 3, wherein the embedding function comprises a matrix.

5. The method of claim 1, wherein the learning of the embedding function comprises maximizing a correlation between the embedded first and second views of the training samples in the common feature space.

6. The method of claim 1, wherein the learning of the embedding function comprises Canonical Correlation Analysis.

7. The method of claim 1, wherein the method further comprises partitioning views in a set of views into a first set of views and a second set of views, the first set of views comprising the first view but not the second view and the second set of views comprising the second view but not the first view.

8. The method of claim 7, wherein the partitioning of the views is based on cost.

9. The method of claim 1, wherein the second view is more costly to obtain than the first view.

10. The method of claim 1, wherein the first and second views are selected from textual, visual, and layout-based views.

11. The method of claim 10, wherein the second view is a textual-based view computed on frequencies of words identified in the output of an OCR engine and the first view is a visual-based view or a layout-based view which is computed independently of the word frequencies.

12. The method of claim 1, wherein the learning of the embedding function for embedding the first views of the training samples in the first set into a common feature space with the second views is an unsupervised learning.

13. The method of claim 1, wherein the original feature space of the second view is the same as the common feature space.

14. The method of claim 1, wherein the providing of the first view of the training sample comprises extracting a first set of features from the training sample in the first feature space and the providing of the second view of the training sample comprises extracting a second set of features in the second original feature space.

15. The method of claim 1, wherein the common feature space comprises fewer features than the original feature space of the first view and optionally comprises fewer features than the original feature space of second view.

16. A system for performing the method of claim 1 comprising memory which stores instructions for learning the embedding function for embedding the first views of the training samples in the first set into the common feature space, embedding the first view of each of the training samples in the second set into the common feature space using the embedding function, and training the classifier based on the first view of each the training samples in the first set which has been embedded in the common feature space and the respective label, and a processor which executes the instructions.

17. A computer program product comprising a non-transitory storage medium which stores instructions which, when executed by a computer, perform the method of claim 1.

18. A classifying method comprising;
providing a classifier trained by the method of claim 1;
for a test sample to be labeled, generating the first view of the test sample in the original feature space;
embedding the first view of the test sample into the common feature space with the learned embedding function; and
predicting a label for the test sample, comprising classifying the test sample with the trained classifier based on the embedded first view of the test sample.

19. The method of claim 1, wherein the training samples in the first set are unlabeled training samples.

20. A classification method comprising:
providing a classifier which has been trained on labeled training samples generated by embedding a first view of each of the labeled training samples into a common feature space with an embedding function which has been learned using a set of possible views of training samples, the set of possible views comprising the first view and a second view;
for a test sample, generating the first view of the test sample;
embedding each of only a subset of the set of possible views of the test sample into the common feature space with the embedding function, the subset comprising the first view, but not the second view; and
predicting a label for the test sample, comprising classifying the embedded first view of the test sample with the trained classifier.

21. The method of claim 20, further comprising partitioning views in a set of views into a first set of views and a second set of views, the first set of views comprising the first view but not the second view and the second set of views comprising the second view but not the first view.

22. The method of claim 21, further comprising associating a cost with each of the views in the set of views, the partitioning being based on the assigned costs.

23. The method of claim 20, wherein the training samples used in the learning of the embedding function are unlabeled.

24. A computer program product comprising a non-transitory storage medium which stores instructions which, when executed by a computer, perform the method of claim 20.

25. A classification system comprising:
an embedding component which has been trained to embed a first view of a test sample into a common feature space, an embedding function having been learnt on the first view and a second view of each of a set of training samples;
a labeling component which labels the test sample which has been embedded into the common feature space, the labeling component using a classifier which has been trained on the first view of labeled training samples embedded into the common feature space but not on the second view of any of the labeled training samples; and
a processor which implements the embedding component and labeling component.

26. The classification system of claim 25, further comprising:
a classifier training component, implemented by the processor, for training the classifier using only views in the first set of views, for the labeled training samples, which have been embedded in the common subspace.

27. The classification system of claim 25, further comprising:
a partitioning component which partitions views of the set of training samples into a first set of views and a second set of views, the first set of views comprising at least the first view and the second set of views comprising at least the second view.

* * * * *